April 6, 1965  R. KUCHEN ETAL  3,176,669
SELF-ADJUSTING HYDRAULIC VALVE LIFTER FOR PISTON ENGINES
Filed Feb. 27, 1964  3 Sheets-Sheet 1

INVENTOR
RICHARD KÜCHEN
HANS JÜRGEN SOSSNA

By Hammond & Littell

ATTORNEYS

April 6, 1965  R. KUCHEN ETAL  3,176,669
SELF-ADJUSTING HYDRAULIC VALVE LIFTER FOR PISTON ENGINES
Filed Feb. 27, 1964  3 Sheets-Sheet 2

INVENTOR
RICHARD KÜCHEN
HANS JÜRGEN SOSSNA

By Hammond Littell

ATTORNEYS

United States Patent Office 3,176,669
Patented Apr. 6, 1965

3,176,669
SELF-ADJUSTING HYDRAULIC VALVE LIFTER
FOR PISTON ENGINES
Richard Kuchen and Hans-Jurgen Sossna, Ingolstadt,
Germany, assignors to Motomak, G.m.b.H., Ingolstadt,
Germany, a corporation of Germany
Filed Feb. 27, 1964, Ser. No. 347,856
Claims priority, application Germany, Mar. 2, 1963,
55,969
9 Claims. (Cl. 123—90)

The present invention relates to a self-adjusting hydraulic valve lifter for piston engines. The valve lifter comprises two longitudinally slidable telescoped elements defining a pressure chamber between them, said pressure chamber being connected through a check valve with an antechamber located in one of said elements, said antechamber in turn being supplied through bore holes with hydraulic oil from the lubricating oil circulation system of the engine. Briefly stated, the functioning of such valve lifters is that the structural elements inserted between the valve cam and the valve stem consist of two telescoped and mutually longitudinally slidable parts, of which one cooperates with the valve cam and the other with the valve stem. The hydraulic self-adjustment of such lifters, so that a valve clearance of zero is achieved, is brought about by the fact that oil from the lubricating oil circulation system of the engine is introduced into the space between the two parts which form the valve lifter, and that the pressure chamber receiving this oil is closed off toward the outside by a check valve. When the two elements which form the valve lifter are forced apart so far that they abut without clearance against the valve cam on one end and against the valve stem on the other end, and when, at the same time, the pressure chamber defined by these two elements is completely filled with oil, a lifter results which practically creates a rigid coupling between valve cam and valve stem.

A disadvantage of this lifter construction resides in that, in operation, certain amounts of air are admixed with the oil that enters into the valve lifter. When this oil admixed with air reaches the pressure chamber, there is no longer a rigid coupling between the two valve parts but rather a disadvantageous resilient coupling because of the compressibility of the air. In order to eliminate this disadvantage, it was proposed in co-pending application titled "Self-adjusting Hydraulic Valve Lifter for Piston Engines," Serial No. 347,937 filed February 27, 1964 to provide the pressure chamber with at least one vent bore which leads from the pressure chamber to the outside of the valve lifter. Through this vent bore, which must be located at the uppermost place of the pressure chamber, any air which may have entered into the pressure chamber may escape to the outside.

However, if there is no air present in the pressure chamber, or if air which may have been present has been vented off through the vent bore, a certain amount of oil will continuously escape in the further course of operation which must be replenished by oil flowing from the antechamber. In order to keep the oil loss as much as possible, it was proposed in the co-pending application to insert a a throttle slit in front of the vent bore.

It has been found that the amount of oil leaking out through the vent bore is especially large in that phase of operation when the valve cam is in contact with the valve lifter and thus places the lifter under pressure. This intensified leakage of oil is entirely undesirable. It means that the amount of lost oil must subsequently be replenished again from the antechamber, whereby the danger that air again reaches the pressure chamber is increased.

It is therefore an object of this invention to provide a hydraulic valve lifter with which oil losses under pressure are kept at a minimum and little replenishment of hydraulic fluid is required.

A further object of the invention is to provide automatic means to vent air in a hydraulic valve lifter without excessive losses of hydraulic fluid.

These and other objects of our invention will become apparent as the description thereof proceeds.

In accordance with the present invention the above-mentioned disadvantage is overcome by inserting a self-actuating closure or throttle element before or after the vent bore, which partially or entirely closes off the vent bore when a certain excess pressure exists in the pressure chamber. In this manner it is possible to effect a complete or only partial closure of the vent bore during the working phase when the cam is in contact with the lifter, so that the amount of leaking out does not exceed a certain low value.

The closure or throttle element can then at the same time serve another purpose when it is so constructed that, in the open position, it forms an opening of such small cross-section that an additional throttling of the vent bore results therefrom. The additional structural elements which must be provided for formation of the throttle slit according to the parent application can then be optionally omitted.

The closure or throttle element itself may be of varying structure. For example, it may be formed by a ball check valve or by a spring-tensioned plate valve. In the latter case it has been found to be particularly advantageous to form the sealing surface of the plate valve by an annular rope ring. The rope ring may selectively be seated in an annular groove of the sealing plate or also in a groove of the seating surface in the corresponding lifter part.

However, the closure or throttle element may also be formed by an element which consists of a cylindrical part provided at one end with a flange. The cylindrical part may be mounted in a bore of one of the lifter parts with such an amount of clearance that a throttle slit results, while the flange of this part cooperates with a recess of the bore in which it was mounted to form a seal when the pressure in the pressure chamber exceeds a certain value.

In all the cases described above the movable valve part, that is, the ball, the plate or also the last described sealing element, is under the action of a spring whose spring force is so designed that the valve completely or partially closes when the cam is in contact with the lifter and the pressure in the pressure chamber thereby rises to a value of more than about 4 atmospheres gauge.

The self-actuating closure or throttle element may, however, also be formed in particularly advantageous fashion from a readily elastically deformable material which is mounted with clearance in an axial bore of one of the lifter parts. As described above, a throttle slit is formed thereby between the cylindrical part and the corresponding bore wall.

When the pressure in the pressure chamber exceeds a certain value, however, this cylindrical element is at the same time deformed in such a way that it widens readily and thus entirely or partially closes off the bore. In this connection it is possible to make the cylindrical part a massive element or also, for example, to provide it with an air-filled hollow space. The cylindrical part itself may consist of rubber, elastic plastic or the like, for example.

Finally, the closure or throttle element may also be formed by an elastic sleeve whose free edge cooperates with an axial bore in one of the lifter parts. In this case the diameter of the free edge of the sleeve may also be selected such that it forms a throttle slit with the corresponding bore wall in its open state. Upon the occurrence of increased pressure the free edge of the sleeve lies up against the bore wall and partially or entirely seals off the vent bore.

The invention may be better understood by reference to the figures in which

Figure 1:
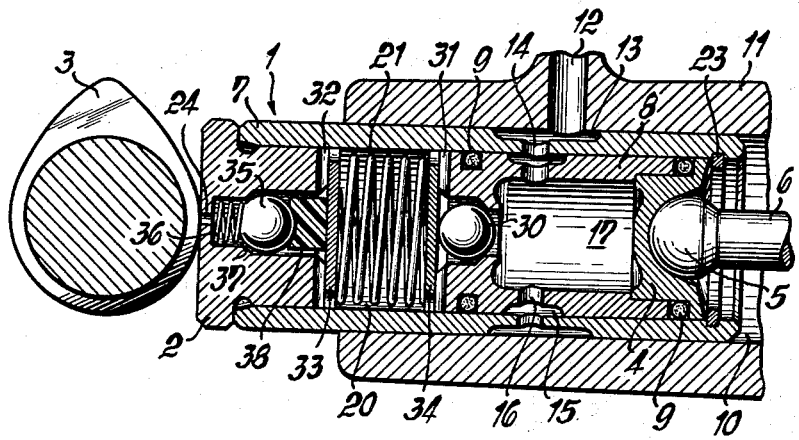
FIG. 1 shows a longitudinal cross-sectional view of a valve lifter having a pressure operated ball valve closure.

Referring to FIG. 1, valve lifter 1 comprises a mushroom plate 2 which is in contact with valve cam 3 and at the other end is in contact by means of ball socket 4 with the spherical end 5 of valve stem 6. The valve lifter 1 consists essentially of casing 7 which is closed off at one end by mushroom plate 2 and of sliding element 8 which is connected with valve seat 4 into a rigid structural part. The two parts 7 and 8 are longitudinally slidably telescoped into each other with relatively large clearance and are sealed with respect to each other by rope rings 9. Casing 7 is also longitudinally slidably mounted in a bore 10 of engine block 11.

Engine block 11 comprises lubricating oil channel 12 which terminates in a bore 10 and is connected to the lubricating oil circulation systems of the engine. In the area in which channel 12 terminates in bore 10 the casing 7 is provided with an annular groove 13 about its outer circumference. Within the area of this groove it at the same time comprises several bores 14 uniformly distributed over its circumference.

In similar fashion, in the area in which these bores 14 terminate, the sliding element 8 within casing 7 is provided with a circumferential groove 15 in the area of which the sliding element 8 also comprises several bores 16 distributed over the circumference. These bores 16 terminate in antechamber 17 located within the sliding element 8, said antechamber being defined radially by the sliding element 8 and axially by ball seat 4 and valve ball 30. The sliding element 8 is provided with radially directed channels 31 on its forward face. The surface of mushroom plate 2 which faces sliding element 8 comprises analogous radially directed channels 32.

Coil spring 21 abuts against the two plates 33 and 34 which define channels 31 and 32; the coil spring tends to force apart the two axially slidable parts 2 and 7 on the one hand and 4 and 8 on the other hand. The extreme sliding position of these parts is determined by a ring 23 mounted in a bore of casing 7 against which the ball seat 4 abuts.

Pressure chamber 20 is limited radially by casing 7 and axially by mushroom plate 2 and slidable element 8. The axially directed vent bore 24 leads from this pressure chamber toward the outside, and the vent bore at the same time serves for lubricating the valve cam 3. For closing off the vent bore 24 a ball check valve is provided which is formed of ball 35 which is under the influence of coil spring 36. Ball 35 is in sealing cooperation with valve seat 37. The opening of the valve is limited by part 38 against which ball 35 abuts.

For an explanation of the function of this valve lifter it is first assumed that antechamber 17 as well as pressure chamber 20 and the corresponding feed bores 12, 14 and 16 are completely filled with oil. Spring 21 forces apart the two principal parts of which the valve lifter is made up until mushroom plate 2 abuts against cam 3 and ball seat 4 abuts against the spherical end 5 of valve stem 6. Valve ball 30 is maintained in its seat by the small excess pressure which exists in pressure chamber 20. Thus, a certain volume of oil is enclosed in pressure chamber 20 between the two principal parts forming the valve lifter.

When cam 3 exerts a pressure upon mushroom plate 2, practically the entire valve lifter 1 will move toward the right as a rigid coupling member and will thereby displace valve stem 6 by a corresponding amount. In this position, by virtue of the high pressure developed in the pressure chamber during contact of the cam 3, valve ball 35 is also pressed into its seat 37 in opposition to the action of coil spring 36, so that the vent bore 24 is completely closed off.

Only when valve lifter 1 has passed through its entire lift stroke and again returns into the position shown in FIG. 1 will the pressure in pressure chamber 20 be reduced to such an extent that ball 35 is again lifted from its seat 27 by spring 36, so that the vent bore 24 is opened. In this position ball 35, however, will be able to rise from its seat 37 only to such an extent that a throttle slit results between these two parts. The size of the throttle slit is determined by the dimensions of element 38.

In the description of further embodiments, same reference numerals as in FIG. 1 shall be used for structurally equivalent or functionally equivalent parts.

Figure 2:
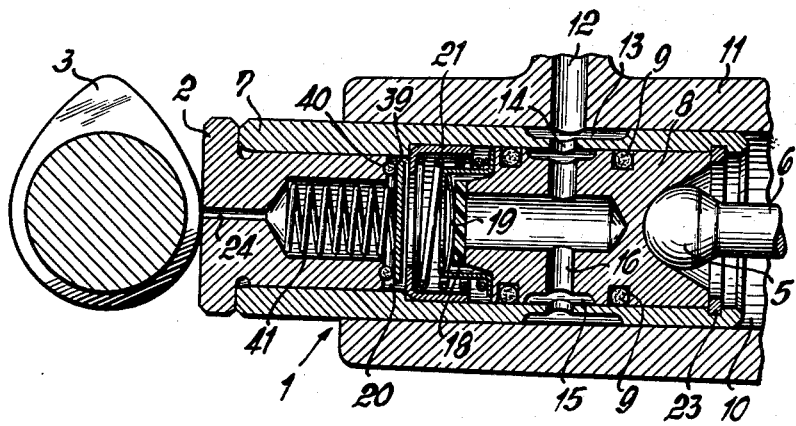
FIGS. 2 and 2a show a longitudinal cross-section view of a valve lifter similar to FIG. 1 having a pressure operated plate valve closure.
Figure 2A:
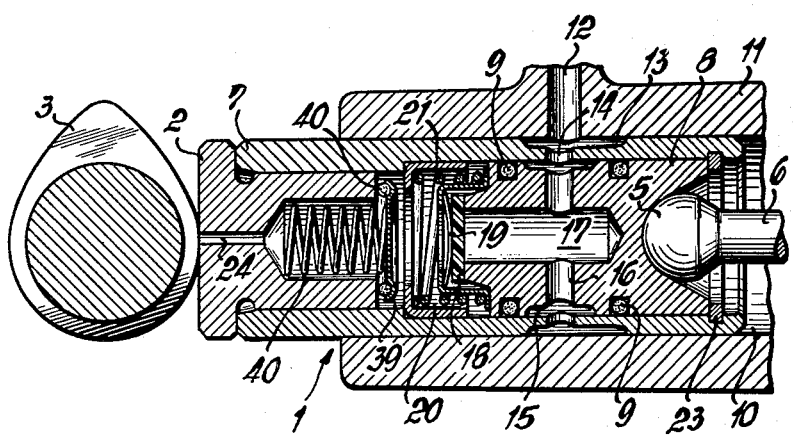

The valve lifter according to FIGS. 2 and 2a does not differ substantially from that of FIG. 1. Only valve ball 30 is replaced by valve plate 18 which is forced against its seat by leaf spring 19. In addition, the ball check valve, which serves to close off vent bore 24, has been replaced by a plate valve.

This pressure plate valve consists of a valve plate 39 which is under the action of coil spring 40. The valve seat is formed by an annular rope ring 41. In FIG. 2 an embodiment is illustrated in which this rope ring 41 is seated in a circumferential groove in the surface of mushroom plate 2. In FIG. 2a the valve is similar to that in FIG. 2, except that the rope ring 41 is seated in an annular depression in valve plate 39.

Figure 3:
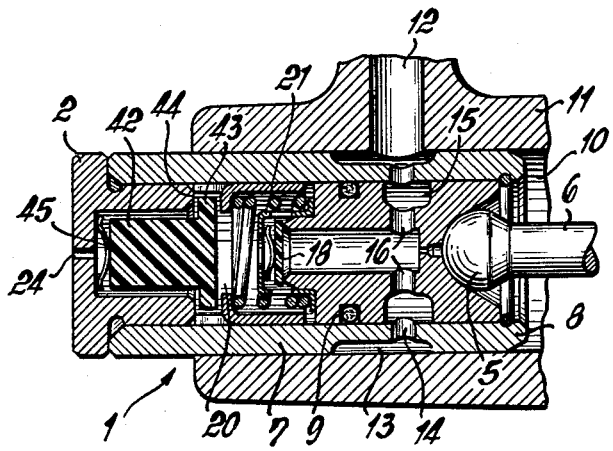
FIG. 3 shows a longitudinal cross-sectional view of a valve lifter having a flanged cylinder for closure under pressure.

In FIG. 3 a sealing element 42 is used for sealing off the vent bore 24, said sealing element 42 being cylindrical and mounted with radial play in a bore of mushroom plate 2. At one of its ends this sealing element 42 is provided with a flange 43 which, upon occurrence of excess pressure in pressure chamber 20, forms a seal by lying up against the surface 44 of mushroom plate 2. The entire sealing element 42 is under the influence of a leaf spring 45.

Figure 4:
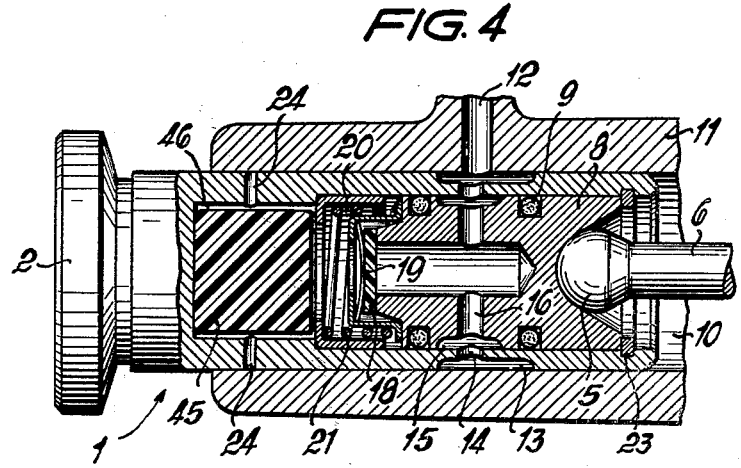
FIGS. 4 and 4a show a longitudinal cross-sectional view of a valve lifter having an elastically deformable cylindrical closure.
Figure 4A:
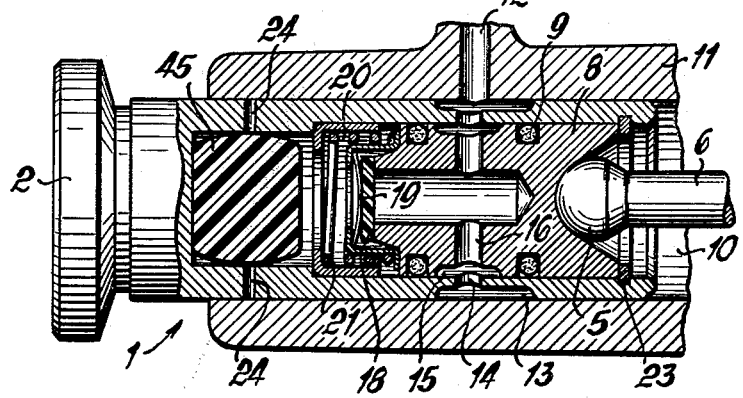

In the embodiment shown in FIGS. 4 and 4a, several radially directed vent bores 24 are provided in pressure chamber 20. Within pressure chamber 20 a sealing element 45 of radially elastically deformable material is located which forms a narrow slit 46 with the wall of pressure chamber 20 in unstressed condition in order to throttle the vent bores 24. FIG. 4 shows this condition. In FIG. 4a, however, the sealing element 45 is shown in a position which it assumes when the pressure in pressure chamber 20 has risen to a higher value. By virtue of this pressure the sealing element 45 is axially compressed, whereby it widens radially until it lies up against the wall of the pressure chamber and thereby completely closes off vent bores 24.

Figure 5:
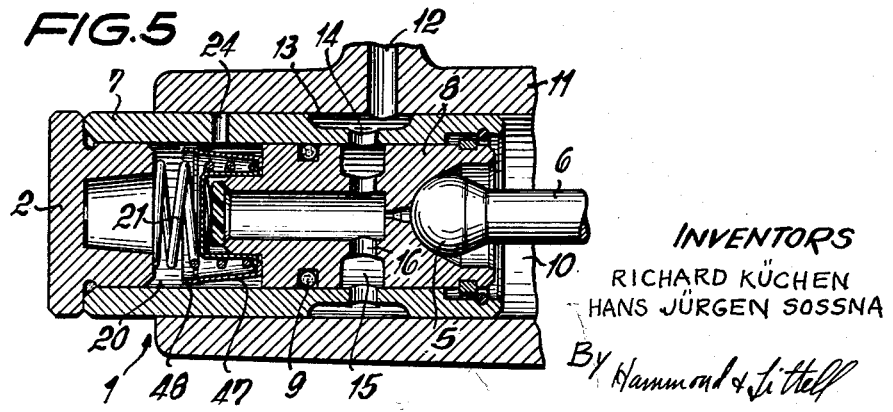
FIG. 5 shows a longitudinal cross-sectional view of a valve lifter having an elastically deformable sleeve as a closure.

Finally, in the embodiment according to FIG. 5 a sealing sleeve 47 is provided for closing off vent bore 24, the free edge 48 of said sealing sleeve forming a narrow slit with the wall of pressure chamber 20, said slit being located as a throttle slit ahead of vent bore 24. When cam 3 comes in contact with mushroom plate 2 of the valve lifter and the pressure in pressure chamber 20 is thereby increased, the free edge 48 of lifter 47 lies up against the wall of pressure chamber 20 and thereby completely closes off the bore 24.

While we have disclosed certain preferred embodiments of our invention, it will be understood that this is solely for the sake of illustration and to enable persons skilled in the art to understand the invention. The invention can

We claim:

1. A self-adjusting hydraulic valve lifter for piston engines comprising two cylindrical longitudinally slidable telescoped members closed on the extreme ends defining a pressure chamber between said members, check valve means connecting said pressure chamber with an antechamber located in one of said cylindrical members, bore holes in said members for providing hydraulic fluid to said antechamber, said cylindrical members being telescoped into each other with relatively large clearance, elastic sealing elements sealing off the said two members with respect to each other, at least one vent bore for said pressure chamber communicating with the outside of the valve lifter from the pressure chamber, a self-actuating closure and throttle element inserted in the pressure chamber adjacent said vent bore, said closure element closing off the vent bore when a certain over-pressure exists in the pressure chamber.

2. Valve lifter according to claim 1 wherein the hydraulic fluid is provided from the lubricating oil cycle of the engine.

3. Valve lifter according to claim 1, wherein said self-actuating closure and throttle element provides in its opened position a passage of only such small cross-section that an additional throttling of the vent bore results therefrom.

4. Valve lifter according to claim 1, wherein the self-actuating closure or throttle element is formed by a ball check valve.

5. Valve lifter according to claim 1, wherein the self-actuating closure or throttle element is formed by a spring-loaded plate valve.

6. Valve lifter according to claim 5, wherein the sealing surface for said plate valve is formed by a rope ring.

7. Valve lifter according to claim 1, wherein the self-actuating closure and throttle element is formed by a cylindrical member having a flange thereon, which is guided with clearance in an axial bore of one of the lifter parts, and a recess in said bore wherein said flange and said recess cooperate to form a seal under pressure.

8. Valve lifter according to claim 1, wherein the self-actuating closure and throttle element is formed by a cylindrical member made of readily elastically deformable material, said cylindrical member being mounted with clearance in an axial bore of one of the valve lifter parts.

9. Valve lifter according to claim 1, wherein the self-actuating closure or throttle element is formed by a cylindrical elastic sleeve fixed at one end, whose free edge expands against a bore in one of the valve lifter parts under pressure to close said bore.

References Cited by the Examiner
UNITED STATES PATENTS

| | | | |
|---|---|---|---|
| 1,690,033 | 10/28 | Noble | 123—90 |
| 1,747,456 | 2/30 | Noble | 123—90 |
| 1,798,938 | 3/31 | Hallett | 123—90 |
| 2,145,484 | 1/39 | Johnson | 123—90 |
| 2,394,354 | 2/46 | Barr | 123—90 |
| 2,818,844 | 1/58 | Wood | 123—90 |

FRED E. ENGELTHALER, *Primary Examiner.*